United States Patent [19]
Kokura et al.

[11] Patent Number: 5,621,292
[45] Date of Patent: Apr. 15, 1997

[54] SERVO AMPLIFIER AND SERVO SYSTEM WHICH REDUCE CABLE INTERFACE

[75] Inventors: Masuo Kokura, Hino; Kenichi Ito, Yamanashi, both of Japan

[73] Assignee: Fanuc Ltd., Yamanashi, Japan

[21] Appl. No.: 232,193

[22] PCT Filed: Sep. 2, 1993

[86] PCT No.: PCT/JP93/01244

§ 371 Date: May 4, 1994

§ 102(e) Date: May 4, 1994

[87] PCT Pub. No.: WO94/07188

PCT Pub. Date: Mar. 31, 1994

[30] Foreign Application Priority Data

Sep. 18, 1992 [JP] Japan ..................... 4-249313

[51] Int. Cl.$^6$ ........................ H02P 7/00
[52] U.S. Cl. ........................ 318/599; 318/801
[58] Field of Search ................ 318/798–815, 318/549, 25.4, 138, 439

[56] References Cited

U.S. PATENT DOCUMENTS

| | | | |
|---|---|---|---|
| 3,611,090 | 10/1971 | Johnston et al. | 318/801 X |
| 4,145,643 | 3/1979 | Maeda et al. | 318/138 X |
| 4,197,489 | 4/1980 | Dunn et al. | 318/138 |
| 4,322,671 | 3/1982 | Kawada et al. | 318/798 |
| 4,333,042 | 6/1982 | Kawada et al. | 318/811 |
| 4,368,411 | 1/1983 | Kidd | 318/254 |
| 4,528,486 | 7/1985 | Flaig et al. | 318/254 |
| 4,825,132 | 4/1989 | Gritter | 318/811 |
| 4,958,269 | 9/1990 | Gritter | 318/801 X |
| 4,962,339 | 10/1990 | Schauder | 318/798 |
| 5,350,988 | 9/1994 | Le | 318/254 X |

FOREIGN PATENT DOCUMENTS

| | | |
|---|---|---|
| 62-230574 | 10/1987 | Japan . |
| 62-251902 | 11/1987 | Japan . |
| 63-298403 | 12/1988 | Japan . |
| 1-138995 | 5/1989 | Japan . |

*Primary Examiner*—Jonathan Wysocki
*Attorney, Agent, or Firm*—Staas & Halsey

[57] ABSTRACT

A servo system includes a communication cable which is disposed between a servo control circuit and a servo amplifier. A feedback cable and a power cable are each connected between the servo amplifier and a servo motor. The communication cable includes a command signal line from the servo control circuit to the servo amplifier and a feedback signal line. The command signal line includes three PWM signal lines instead of six PWM signal lines through the use of inverters in the servo amplifier, ground lines, an enable signal line, and other various signal lines. The feedback signal line transmits a position feedback signal, which is sent from the servo motor via the servo amplifier, to the servo control circuit. Thus, a number of signal lines between the servo control circuit and the servo amplifier become unnecessary and are used as feedback signal lines for transmitting position feedback signals from the servo motor. Therefore, three cables which have so far been necessary to connect a uniaxial servo motor to a servo control circuit can be simplified to one cable.

11 Claims, 3 Drawing Sheets

5,621,292

SERVO AMPLIFIER AND SERVO SYSTEM WHICH REDUCE CABLE INTERFACE

TECHNICAL FIELD

The present invention relates to a servo amplifier and a servo system including the servo amplifier, and more particularly to a servo amplifier and a servo system which are intended to reduce the servo interface.

BACKGROUND ART

A numerical control apparatus (hereinafter referred to as "NC") requires two kinds of cables to control one axis: one is a command cable which connects a servo amplifier to a servo control circuit and the other is a feedback cable which connects a pulse coder to the servo control circuit. Corresponding to these two kinds of cables are at least four interfaces (connectors) which must be installed.

FIG. 3 illustrates a connecting relationship between a servo control circuit for a conventional NC, a servo amplifier, and a servo motor. As shown in this figure, a command cable 87a is installed between the servo control circuit 11a for NC 1a and the servo amplifier 2a via interfaces 81a and 82a. Also, a feedback cable 88a is installed between the servo control circuit 11a and a pulse coder 61a, which detects the position of servo motor 6a, via interfaces 83a and 84a. When the pulse coder 61a is of a position data hold type, it is necessary to install a battery cable 90a between a battery 91, which supplies power to the pulse coder 61a, and the servo control circuit 11a via an interface 85a. Between the servo motor 6a and the servo amplifier 2a, a power transmission cable 96 is installed via interfaces 94 and 95.

As described above, three cables 87a, 88a, and 90a are required around the NC 1a to connect the uniaxial servo motor 6a to the servo control circuit 11a. Accordingly, many interfaces such as 81a, etc. are required.

However, the number of controlled axes to be controlled by one control section (numerical control apparatus) tends to increase year by year because of the advances in numeric control and the demand of the market. As the number of controlled axes increases, the number of interfaces (connectors) with the servo control circuit increases, resulting in an increase in the proportion of connectors in the mounting space of the control section.

On the other hand, there is a strong market demand for miniaturizing numerical control apparatuses. Although the integration of control circuits has been achieved to meet this demand, a considerable number of connectors must be mounted. Accordingly, miniaturization cannot be attained effectively as a whole.

Further, because cables are concentrated on the numerical control apparatus, it is hard to perform wiring work around the numerical control apparatus, thus increasing time required for wiring work.

SUMMARY OF THE INVENTION

The present invention was made in view of the above situation. Accordingly, an object of the present invention is to provide a servo amplifier and a servo system in which one cable is used between the servo control circuit and a servo amplifier, and a servo motor.

To solve the above problems, an embodiment of the present invention provides a servo amplifier which drives a servo motor by receiving a PWM command signal from a servo control circuit. Three PWM signal lines transmit a PWM command signal, which is inputted to input-side PWM control devices via amplifiers, from the servo control circuit. Three inverters which are connected to the three PWM signal lines to invert the PWM command signal and output same to output-side PWM control devices.

Further, an embodiment of the present invention provides a servo system composed of a servo control circuit, a servo amplifier, and a servo motor. The servo amplifier has three PWM signal lines for transmitting a PWM command signal, which is inputted to high-side PWM control devices via amplifiers, from the servo control circuit. Three inverters are connected to the three PWM signal lines to invert the PWM command signal and output it to low-side PWM control devices. One cable connects the servo amplifier to the servo control circuit and has a command signal line, three PWM signal lines from the servo control circuit to the servo amplifier, and a feedback signal line which transmits a position feedback signal from the servo motor to the servo control circuit via the servo amplifier. Interfaces which are installed on the side of the servo control circuit and on the side of the servo amplifier of one cable.

A PWM command signal transmitted from the servo control circuit through three PWM signal lines is inputted to the high-side PWM control devices via the amplifiers on the servo amplifier side. Three inverters, which are connected to three PWM signal lines, invert three PWM command signals and output them to the low-side PWM control devices. Therefore, on the servo amplifier side, three PWM command signals from the servo control circuit, which have previously been needed, become unnecessary. For this reason, three PWM signal lines are not required. Further, three ground lines, each of which is installed in parallel to each of the three PWM signal lines, are not required. In effect, a total of six signal lines between the servo control circuit and the servo amplifier are not required.

The signal lines which become unnecessary are used as feedback signal lines for transmitting position feedback signals from the servo motor to the servo control circuit. Therefore, three cables which have so far been necessary to connect the uniaxial servo motor to the servo control circuit can be simplified into one cable. Accordingly, only interfaces on both sides of the cable are required. As a result, the interface mounting space around the numerical control apparatus can be decreased, by which the numerical control apparatus can be made compact as a whole. Further, the concentration of cables to the numerical control apparatus can be avoided, so that wiring work around the numerical control apparatus can be performed smoothly and in a short period of time.

BEST MODE FOR CARRYING OUT THE INVENTION

One embodiment of the present invention will be described below with reference to the drawings.

Figure 1:
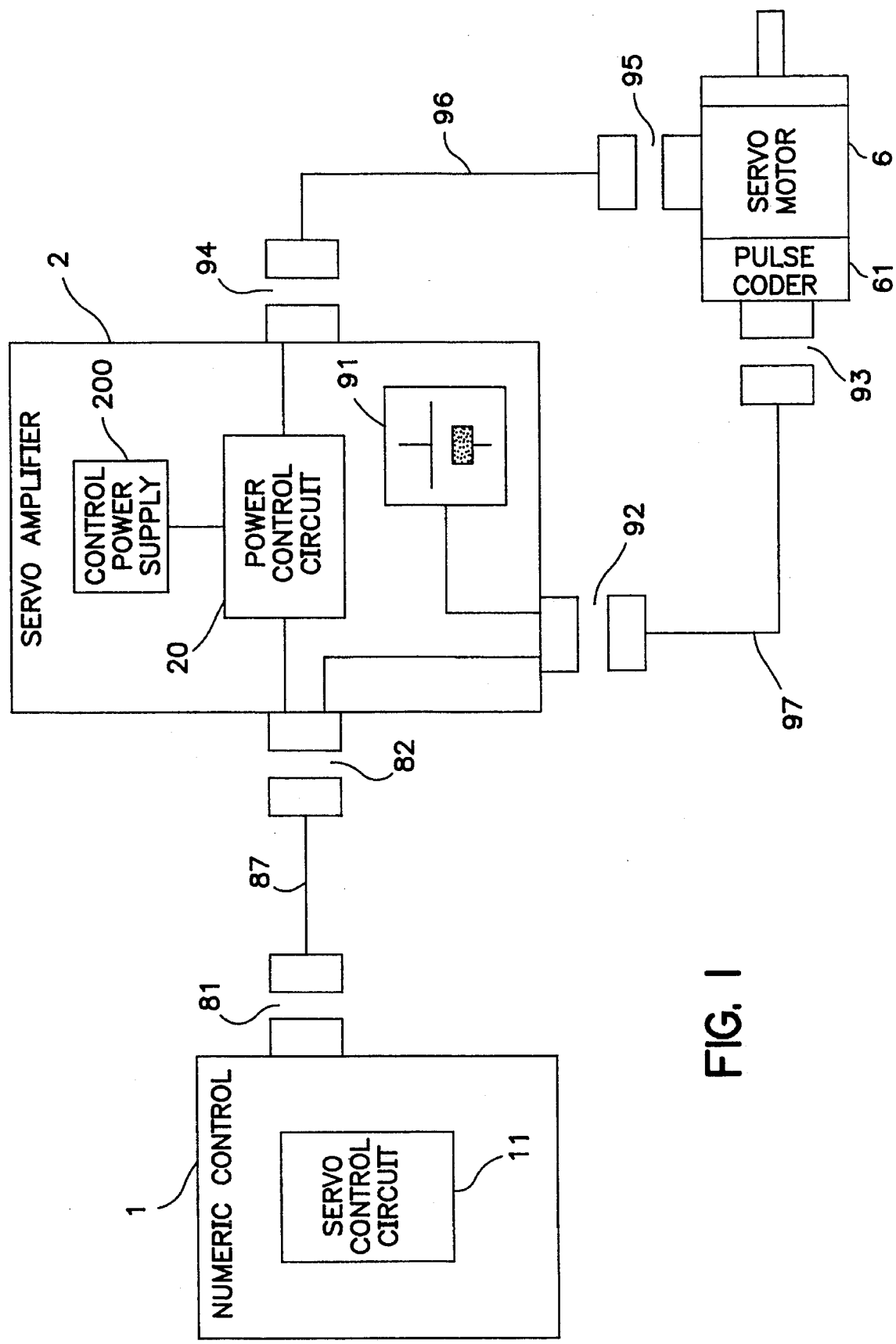
FIG. 1 is a schematic diagram illustrating the configuration of a servo system in accordance with the present invention.
Figure 2:
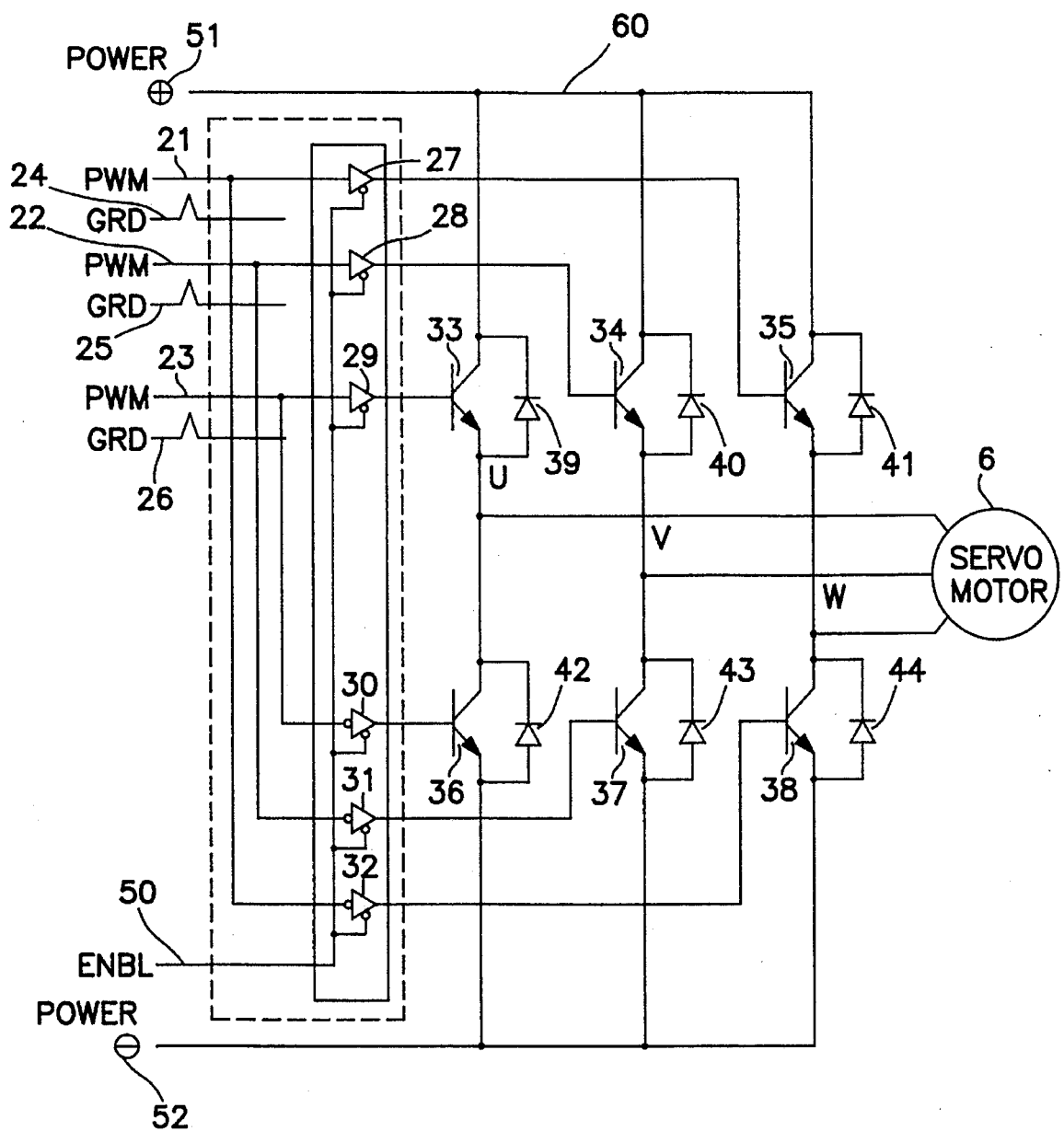
FIG. 2 is a circuit diagram of an inverter section for a servo amplifier in accordance with the present invention.
Figure 3:
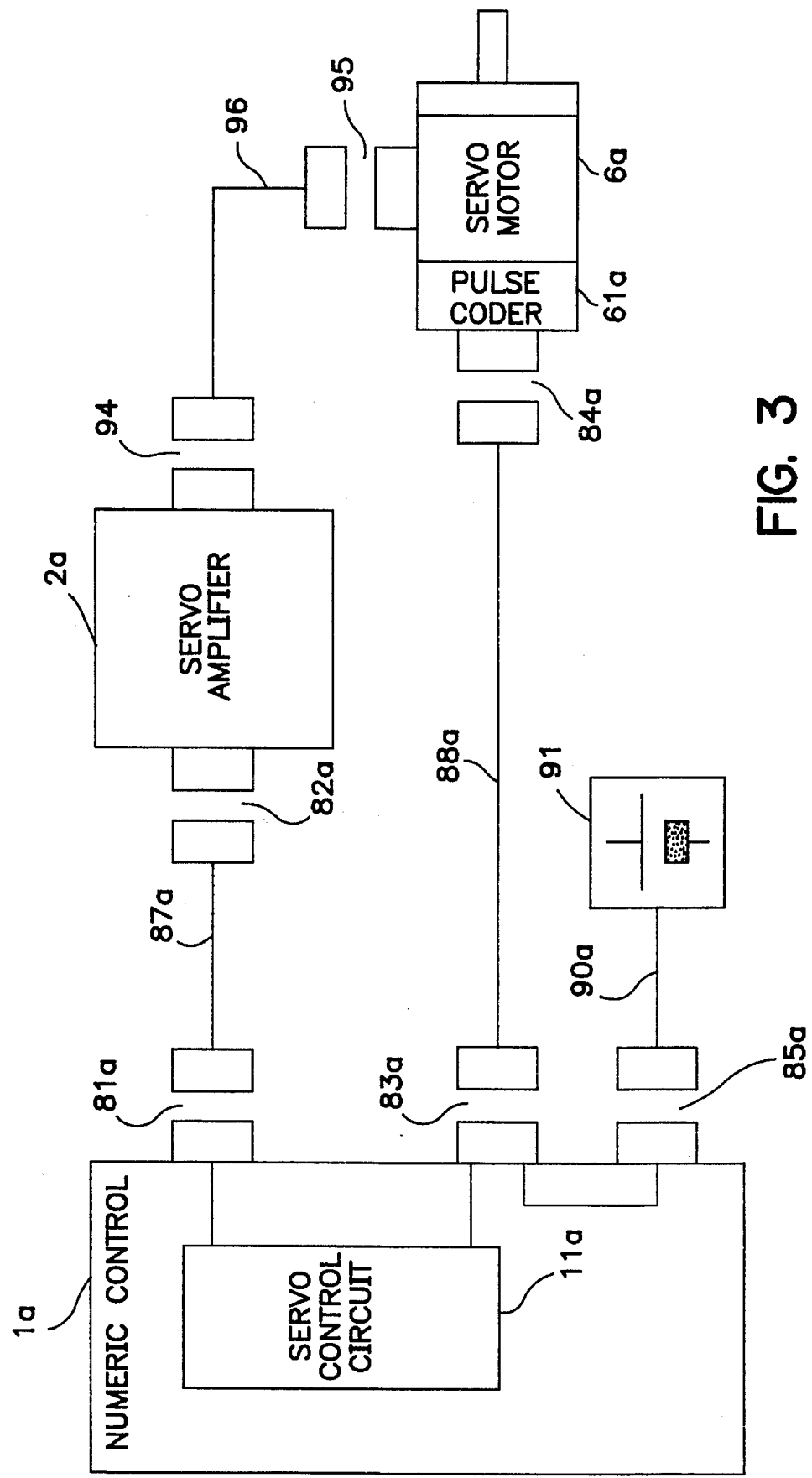
FIG. 3 illustrates a connecting relationship between a servo control circuit for a conventional NC, a servo amplifier, and a servo motor.

FIG. 2 is a circuit diagram of an inverter section for a servo amplifier of the present invention. In this figure, the inverter section 60 is mounted in a power control circuit 20 (FIG. 1), and its circuit is configured mainly by power transistor devices. The inverter section 60 outputs a sinusoidal voltage of any frequency and voltage to control the rotational speed of a servo motor 6 by receiving a PWM command signal from the servo control circuit 11 (FIG. 1).

A control power supply 200 (FIG. 1) is connected to power terminals 51 and 52 of the inverter section 60. Across these power terminals 51 and 52, the aforesaid power transistor device circuit is configured.

Specifically, to the positive power terminal 51 are connected respective collector terminals of high-side transistors 33, 34, and 35, and to the emitter terminals thereof are connected respective collector terminals of low-side transistors 36, 37, and 38. To respective emitter terminals of the transistors 36, 37, and 38, a negative power terminal 52 is connected. Each of diodes 39 to 44 is connected in parallel to each of the transistors 33 to 38. The anode and cathode terminals of the diodes 39 to 44 are connected to the emitter and collector terminals of the transistors 33 to 38, respectively. A servo motor 6, being connected between the input-side transistors 33 to 35 and the output-side transistors 36 to 38, is driven by the supply of a three-phase AC voltage having U, V, and W phases.

The PWM command signal from the servo control circuit 11 is transmitted through signal lines 21, 22, and 23, and inputted to the aforesaid high-side transistors 33, 34, and 35 via amplifiers 27, 28, and 29 for stabilization, respectively. Also, the PWM command signal transmitted through the signal lines 21, 22, and 23, after being branched, is on-off inverted by inverters 30, 31, and 32, and then inputted to the low-side transistors 36, 37, and 38. The signal lines 21, 22, and 23 have ground lines 24, 25, and 26, respectively, which are formed in parallel.

An enable signal from the servo control circuit 11 is transmitted through a signal line 50. The enable signal, being inverted, is outputted to the amplifiers 27 to 29 and the inverters 30 to 32.

In the inverter section 60 of the above configuration, when an ON signal is inputted as the PWM command signal by way of, for example, signal line 21, the ON signal is inputted to the transistor 35. Also, this ON signal is inverted into an OFF signal by the inverter 32, and inputted to the transistor 38. That is to say, when one transistor 35 is turned on, the other transistor 38 is turned off. As a result, AC voltage of W phase is supplied to the servo motor 6. Thus, the transistor of each phase is turned on/off by the PWM command signal, so that the speed control of the servo motor 6 is performed by outputting a sinusoidal AC voltage of any frequency and voltage.

The enable signal is given for turning off all transistors 33 to 38. When the enable signal is ON, the PWM command signal for each transistor 33 to 38 is effective. Whereas when the enable signal is OFF, the transistors 33 to 38 are turned off, so that the servo motor 6 has high impedance and is thereby being stopped.

With this configuration, three PWM command signals are used for high-side transistors 33 to 35, and are also used for low-side transistors 36 to 38 by being inverted by the inverters 30 to 32. Therefore, the PWM command signals to the low-side transistors 36 to 38 which have so far been independently needed become unnecessary. For this reason, three PWM signal lines are not required. Further, three ground lines installed in parallel to the respective PWM signal lines are not required. In effect, a total of six signal lines between the servo control circuit 11 and the servo amplifier 2 are not required. Since an enable signal is sent from the servo control circuit 11 in this configuration, five signal lines become unnecessary on balance.

The unnecessary signal lines are then used as the feedback signal lines which transmit the position feedback signal from the servo motor 6 to the servo control circuit 11. Next, the configuration of a servo system in which the unnecessary signal lines are used as feedback signal lines is described.

FIG. 1 is a schematic view illustrating the configuration of a servo system in accordance with an embodiment of the present invention. In this configuration, the servo system is a system which comprises a servo control circuit, a servo amplifier, and a servo motor. As shown in the figure, a cable 87 is installed between the servo control circuit 11 for the NC 1 and the servo amplifier 2 via interfaces 81 and 82. A feedback cable 97 is installed between the servo amplifier 2 and a pulse coder 61 for detecting the position of servo motor 6 via interfaces 92 and 93. A battery 91 for supplying power to the position data hold type pulse coder 61 is installed in the servo amplifier 2. The battery 91 is connected to the pulse coder 61 via interfaces 95 and 93 and a feedback cable 97. Between the servo motor 6 and the servo amplifier 2, a power transmitting cable 96 is installed via interfaces 94 and 95.

The cable 87 installed between the servo control circuit 11 and the servo amplifier 2 includes a command signal line from the servo control circuit 11 to the servo amplifier 2 and a feedback signal line from the servo motor 6. The command signal line comprises the aforesaid three PWM signal lines 21 to 23, ground lines 24 to 26, one enable signal line 50, and other various signal lines. The feedback signal line transmits a position feedback signal, which is sent from the servo motor 6 via the servo amplifier 2, to the servo control circuit 11. This position feedback signal is a serial signal, which comprises a data request signal from the servo control circuit 11 and a data signal which is sent from the pulse coder 61 to the servo control circuit 11 in response to the data request signal. Therefore, the feedback signal line in the above-described cable 87 is composed of two signal lines: a data request signal line and a data signal line.

As described above, the signal lines which become unnecessary between the servo control circuit 11 and the servo amplifier 2 are used as feedback signal lines for transmitting position feedback signals from the servo motor 6. Therefore, three cables which have so far been necessary to connect the uniaxial servo motor 6 to the servo control circuit can be simplified to one cable. Accordingly, only one interface 81 with the cable 87 is required around the NC 1. As a result, the interface mounting space around the NC 1 can be decreased, by which the NC 1 can be made compact as a whole. Further, the concentration of cables to the NC 1 can be avoided, so that wiring work around the NC 1 can be performed smoothly in a short time.

The application of the above-described servo system is not limited to the control of machine tools, and the servo system can be used for, for example, to control a robot in the same manner.

As described above, according to the present invention, the use of inverters in the servo amplifier eliminates the need for three PWM command signals which have so far been needed independently for the output side PWM control devices. Therefore, three PWM signal lines become unnecessary as well as three ground lines installed in parallel to the respective PWM signal lines. That is to say, a total of six signal lines between the servo control circuit and the servo amplifier are not required.

The signal lines which become unnecessary are used as feedback signal lines for transmitting position feedback signals from the servo motor to the servo control circuit. Therefore, three cables which have so far been necessary to connect the uniaxial servo motor to the servo control circuit can be simplified to one cable. Accordingly, only one interface with the cable is required around the numerical control apparatus. As a result, the interface mounting space around the numerical control apparatus can be decreased, by which the numerical control apparatus can be made compact as a whole. Further, the concentration of cables to the numerical control apparatus can be avoided, so that wiring work around the numerical control apparatus can be performed smoothly and in a short period of time.

We claim:

1. A servo amplifier for driving a servo motor through a power transmitting cable by receiving a PWM command signal from a servo control circuit through a control cable, and a feedback signal from a pulse coder through a feedback cable, comprising:

a first interface connected to the control cable for communicating the PWM command signal with the servo control circuit;

a second interface connected to the power transmitting cable for communicating an amplified PWM command signal with the servo motor;

a third interface connected to the feedback cable and to the first interface for communicating a detected position of the pulse coder to the servo control circuit through the first interface and the control cable;

three PWM signal lines for transmitting the PWM command signal from the first interface to a plurality of corresponding high-side PWM control devices; and three inverters connected to said three PWM signal lines for inverting and transmitting said PWM command signal to a plurality of corresponding low-side PWM control devices;

wherein the high-side PWM control devices and the low-side PWM control devices communicate the amplified PWM command signal to the servo motor through the second interface.

2. A servo amplifier according to claim 1 further comprising an enable signal line connected to said first interface and said three inverters to transmit an enable signal from said servo control circuit to said amplifiers after being inverted.

3. A servo system comprising:

a servo motor;

a servo control circuit having a servo control interface;

a servo amplifier further comprising:
   a servo amplifier interface;
   three amplifier PWM signal lines connected to the servo amplifier interface and corresponding high-side PWM control devices via amplifiers;
   three inverters respectively connected between the three amplifier PWM signal lines and corresponding low-side control devices;
   a feedback signal interface receiving a position feedback signal from the servo motor and transmitting the position feedback signal to the servo control interface; and a cable connecting the servo control interface with the servo amplifier interface, said cable including three cable PWM signal lines for transmitting a PWM signal from the servo control circuit to the servo amplifier and a feedback signal line for transmitting the position feedback signal from the servo amplifier to the servo control circuit.

4. The servo system according to claim 3, further comprising:

a position data hold type pulse coder connected to the servo motor and the feedback signal interface for determining a position of the servo motor and transmitting the determined position to the feedback signal interface as the feedback signal; and a battery disposed within the servo amplifier for supplying power to the position data hold type pulse coder.

5. A servo motor system for reducing a servo interface comprising:

a numeric control apparatus having an electrically connected servo control unit and servo interface;

a servo amplifier including:
   a power control circuit electrically connected to a power supply,
   a first amplifier interface electrically connected to the power control circuit, and
   a second amplifier interface electrically connected to the first amplifier interface;

a servo motor unit having a first motor interface which transmits a detected position of a servo motor as a feedback signal to the second amplifier interface; and a cable electrically connecting the servo interface and the amplifier interface including:
   a command signal line for transmitting a command signal from the amplifier interface to the servo interface, and
   a feedback signal line for transmitting the feedback signal from the servo interface to the amplifier interface.

6. The servo motor system according to claim 5, further comprising:

a data hold pulse coder connected between the servo motor and the first motor interface by a feedback cable for detecting a position of the servo motor; and a battery disposed within the servo amplifier and connected to the second amplifier interface wherein power supplied from the battery is transmitted to the data hold pulse coder by way of a feedback cable.

7. The servo motor system according to claim 5, further comprising:

a third amplifier interface attached to the servo amplifier and electrically connected to the power control circuit;

a second motor interface connected to the servo motor unit; and a power transmitting cable electrically connected to the third amplifier interface and the second motor interface for transmitting power to the servo motor unit.

8. The servo motor system according to claim 5 wherein the amplifier drives the servo motor by receiving a PWM command signal from the servo control circuit, said servo motor system further comprising:

three PWM signal lines for transmitting a PWM command signal, which is inputted to high-side PWM control devices via amplifiers from said servo control circuit; and three inverters connected to said three PWM signal lines to invert said PWM command signal and output the inverted PWM command signal to low-side PWM control devices.

9. The servo motor system according to claim 8, further comprising an enable signal line which transmits an enable signal from said servo control circuit, said enable signal being inputted to said amplifiers and said inverters after being inverted.

10. The servo motor system according to claim 5, wherein the command signal line further comprises a plurality of signal lines, a plurality of ground lines equal in number to said plurality of signal lines, and an enable signal line.

11. The servo motor system according to claim 10, wherein the command signal line comprises three signal lines.

* * * * *

UNITED STATES PATENT AND TRADEMARK OFFICE
CERTIFICATE OF CORRECTION

PATENT NO.  : 5,621,292
DATED       : April 15, 1997
INVENTOR(S) : Masuo KOKURA, et al.

It is certified that error appears in the above-indentified patent and that said Letters Patent is hereby corrected as shown below:

Column 2

Line 3, delete "which";

Line 10, "input" should be --inputted--;

Line 23, "input" should be --inputted--.

Column 3

Line 23, "input-side" should be --high-side--;

Line 24, "out-side" should be --low-side--;

Line 29, "inputted" should be --input--;

Line 56, "whereas" should be --whereas,--;

Line 59, delete "being".

Column 4

Line 23, "95" should be --92--;

Line 59, "used for, for example," should be --used, for example,--.

Signed and Sealed this

Nineteenth Day of August, 1997

Attest:

BRUCE LEHMAN

Attesting Officer    Commissioner of Patents and Trademarks